Oct. 17, 1950

C. C. S. LE CLAIR 2,526,372

MULTIPLE FILTER

Filed Jan. 2, 1947

Inventor:
Camille Clare Sprankling Le Clair
By
Hinkle, Horton, Ahlberg, Harrsman & Wupper
Attorneys.

Oct. 17, 1950   C. C. S. LE CLAIR   2,526,372
MULTIPLE FILTER

Filed Jan. 2, 1947   6 Sheets-Sheet 3

FIG. 3.

Inventor:
Camille Clare Sprankling Le Clair
By Hinkle, Horton, Ahlberg, Kunsmann & Kupper
Attorneys.

Oct. 17, 1950 C. C. S. LE CLAIR 2,526,372
MULTIPLE FILTER

Filed Jan. 2, 1947 6 Sheets-Sheet 4

Inventor:
Camille Clare Sprankling Le Clair
By
Hinkle, Horton, Ahlberg, Hansmann & Stupper
Attorneys Oct. 17, 1950   C. C. S. LE CLAIR   2,526,372
MULTIPLE FILTER Filed Jan. 2, 1947   6 Sheets-Sheet 5

Inventor:
Camille Clare Sprankling Le Clair
By
Hinkle, Horton, Ahlberg, Hansmann & Kupper
Attorneys.

Oct. 17, 1950  C. C. S. LE CLAIR  2,526,372
MULTIPLE FILTER

Filed Jan. 2, 1947  6 Sheets-Sheet 6

Inventor:
Camille Clare Sprankling Le Clair
By
Hinkle, Horton, Ahlberg, Hammann & Wupper
Attorneys Patented Oct. 17, 1950

2,526,372

UNITED STATES PATENT OFFICE 2,526,372

MULTIPLE FILTER

Camille Clare Sprankling Le Clair, Acton, London, England, assignor to Tecalemit Limited, Brentford, England, a corporation of Great Britain Application January 2, 1947, Serial No. 719,678
In Great Britain January 9, 1946

13 Claims. (Cl. 210—184)

This invention refers to multiple filter assemblies for filtering oil or other liquids (hereinafter called "liquid" where the context admits) of the kind in which at least one filter is always isolated from the liquid supply system and can be opened, for cleaning, for example, while the other filters are included in the system.

It is one object of the present invention to provide multiple assemblies of the same kind but of improved construction.

According to the present invention, a multiple filter assembly comprises a head having a main liquid inlet chamber and a main liquid outlet chamber isolated from the inlet chamber, three or more independent filters carried by the head, each having its own liquid inlet and its own liquid outlet and each including a filter element arranged in a container which is detachably attached to the head, and a single rotary control valve which is turnably arranged in the head and operable from the exterior of the assembly and which is provided with an inlet port and an outlet port so designed that no matter into which operative position the control valve is brought the said ports provide constant communication between the said main inlet chamber and the said main outlet chamber and the inlets and outlets respectively of all the filters in the assembly with the exception of one at least of the filters, which filter is thus isolated from the liquid supply system, the arrangement being such that one or more filter or filters may be isolated in turn by rotating the control valve in one direction.

The rotary control valve is associated with rotatable means which ensure that the valve shall correctly occupy each of its operative positions, in each of which positions all the filters with the exception of one at least of the total number of filters in the assembly are connected to the liquid supply system. The said ratchet means is also adapted to ensure that the rotary motion of the control valve shall be uni-directional.

For convenience of manufacture, it is preferred to construct the filter head in three parts, viz., a carrier, from which the individual filters are suspended, a valve plate and a valve cover, the control valve being turnably mounted within a guide formed in the valve cover upon the top surface of the valve plate. The control valve is operated from the outside of the apparatus by means of a hand wheel.

If it is desired that one only of the individual filters shall be isolated from the liquid supply system at a time while all the other filters are included in the system, the control valve will be provided with an inlet port which will provide communication between the said main inlet chamber and the inlets of all the filters except one through spaced inlet ports in the top surface of the valve plate, and with an outlet port which, simultaneously, will provide communication between the said main outlet chamber and the outlets of all the filters except the one referred to above through spaced outlet ports in the valve plate, the valve being provided with a blank part which masks the inlet and outlet ports in the valve plate leading to the inlet and outlet of the isolated filter. In one construction, the control valve is provided with a segmental inlet port which is adapted to span all the inlet ports in the valve plate except one, and with a segmental outlet port which is adapted to span all the outlet ports in the valve plate except one, the inlet and outlet ports which are not spanned being masked by a blank portion of the control valve.

Means are provided for preventing all the filters except that which is isolated from the system from being opened. Such means may comprise a part or parts associated with a hand knob provided on a detachable locking bolt which is used to hold the filter container detachably on the carrier. The said part, or parts, on all the hand knobs, are arranged so that if any attempt be made to rotate them when the filter associated therewith is in communication with the system they interfere with a member which is associated with the control valve but the said member is so shaped that there is no interference between itself and the hand knob of any filter which is isolated.

For a purpose which is explained hereinafter means are also preferably provided for ensuring that the control valve shall correctly occupy predetermined intermediate positions between its different operative positions referred to above. Further means are also provided for venting air from, and also for priming, any filter which is being re-included in the liquid system after having been isolated and opened.

One constructional form of the invention, applied to an oil filter having four filters, is shown, by way of example, on the accompanying drawings, whereon:

Fig. 2 is a sectional elevation on the line

A—A in Fig. 1, the valve operating hand wheel being omitted;

Figure 2:
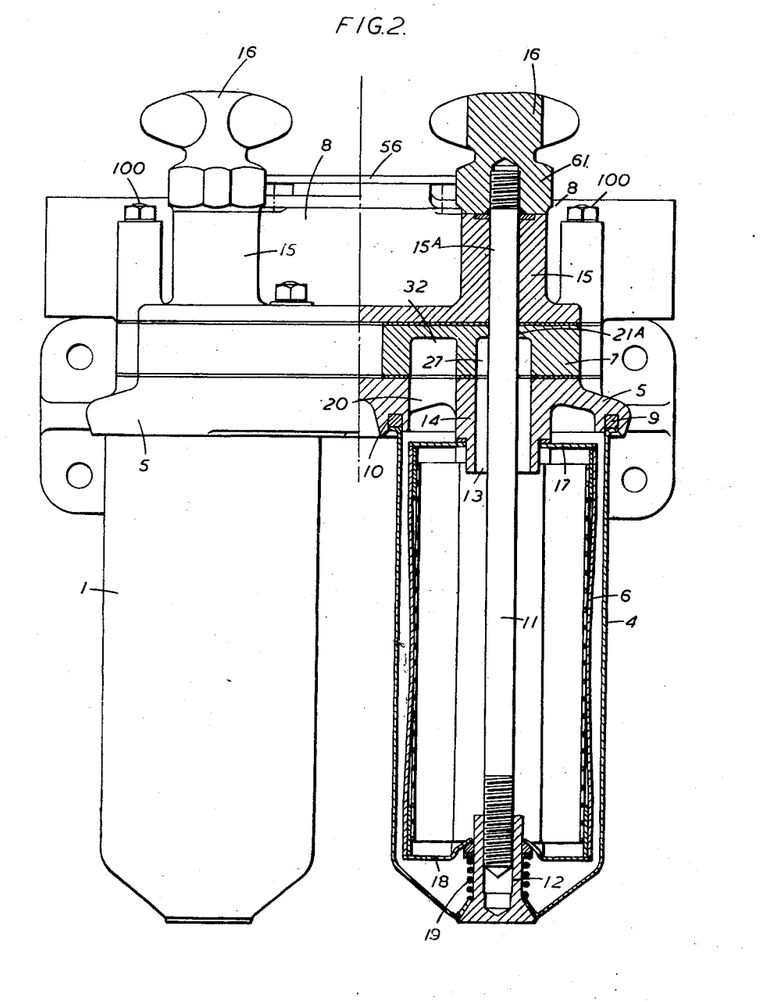
Figure 3:
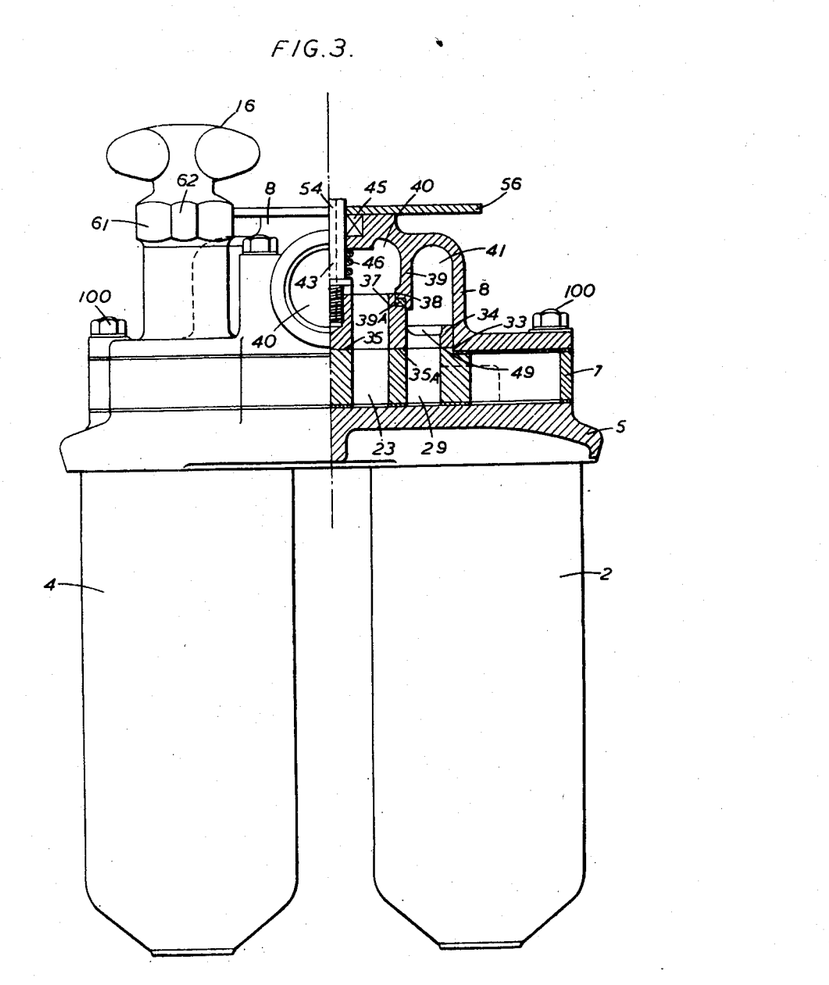
Fig. 3 is a sectional elevation on the line C—C in Fig. 1, the valve operating hand wheel being omitted.
Figure 10:
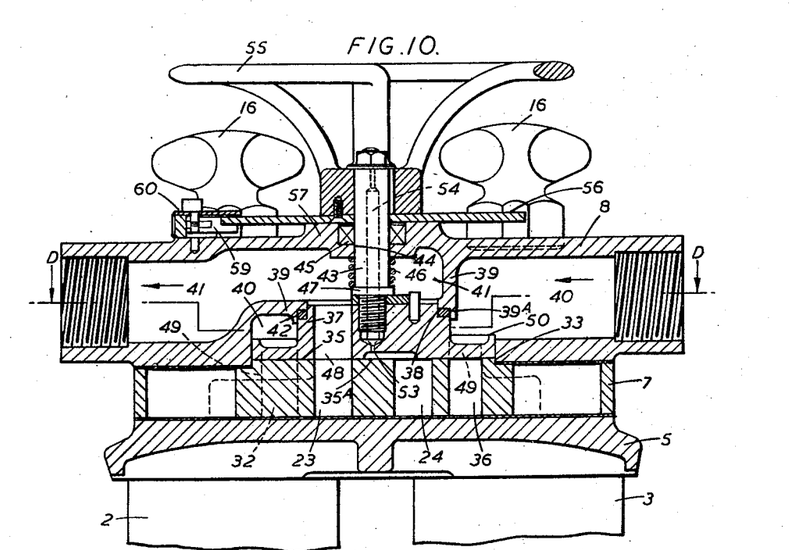
Fig. 10 is a sectional elevation of the filter assembly on the line B—B in Fig. 1.

Referring to the drawings:

The containers 1, 2, 3 and 4 are secured to a common head which, for convenience of manufacture, may, as shown in Figs. 2, 3 and 10, be constructed of three parts, viz., a carrier 5, to which the containers with their filter elements 6 are detachably attached, a valve plate 7 arranged upon the carrier and a valve cover 8 arranged upon the valve plate.

The axes of the containers are arranged at the four corners of a square at the center of which is placed the axis of the control valve, which will be described hereinafter, and the upper edges of the containers are fitted against circular washers 9 of sealing material, see Fig. 2, which are arranged in circular recesses 10 formed in the underside of the carrier. The carrier, the valve plate and the valve cover are bolted together by bolts 100 to form the common head. Each container is held in position upon the carrier in known manner by means of a locking bolt 11, the lower end of which is threaded to screw into a tapped hole formed in a central boss 12 projecting inwardly from the base of the container. The bolts 11 project upwardly through coaxial holes in the carrier, valve plate and valve cover, the holes 13 in the carriers being formed in bosses 14, see Figs. 2, 4 and 5, and enlarged to act as oil outlet passages from the interiors of the filter elements 6. The ends of the bolts 11, which project through the holes 15A in bosses 15 on the valve cover, are fitted with hand knobs 16. In known manner, the filter elements are held between top pressure plates 17, arranged upon the hollow bosses 14 on the carrier and bottom pressure plates 18 which are arranged upon the central bosses 12 on the bases of the containers, and are constantly urged upwardly by coil springs 19 surrounding these bosses.

Figure 4:
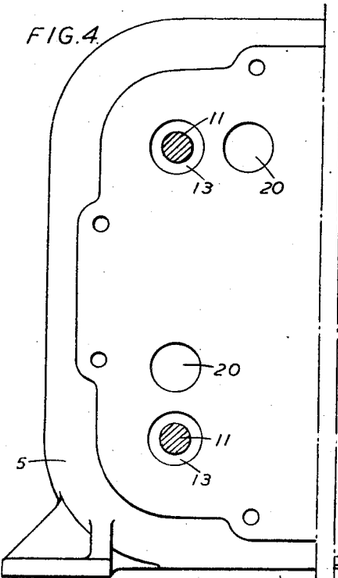
Fig. 4 is a part plan view of the upper side of the carrier.
Figure 5:
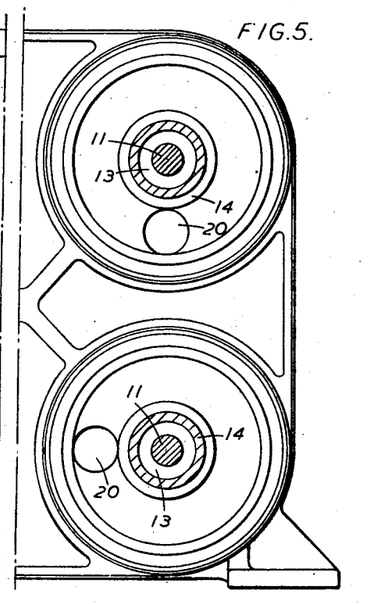
Fig. 5 is part plan view of the underside of the carrier.
Figure 6:
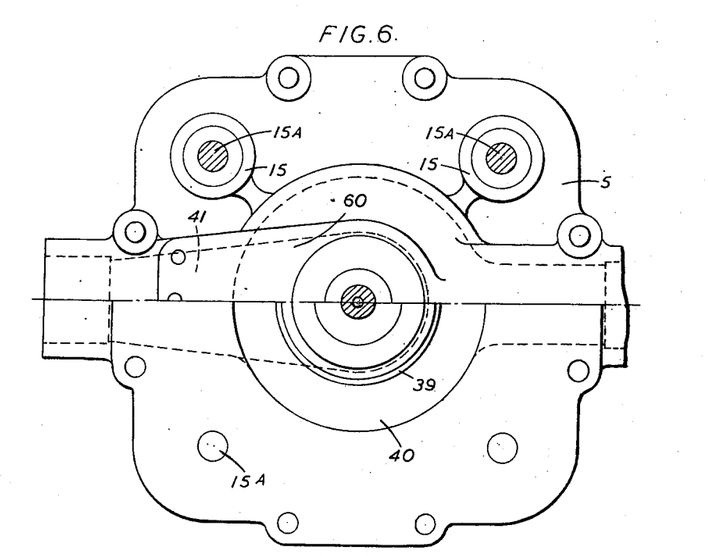
Fig. 6 shows above the transverse centre line a plan view of the upperside of the valve cover and below the centre line a plan view of the underside of the cover.

In addition to the said outlet passages 13, the carrier is provided with four spaced inlet ports 20, Figs. 4 and 5, each of which provides communication between the upper surface of the carrier and the space in one of the containers surrounding the filter element 6 therein. Each outlet passage 13 provides communication between the upper surface of the carrier and the interior of one of the filter elements, see Fig. 2.

Figure 7:
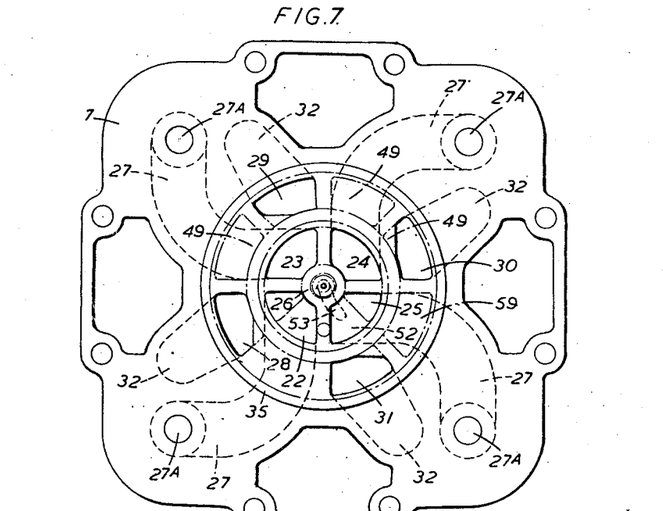
Fig. 7 is a plan view of the upperside of the valve plate.
Figure 8:
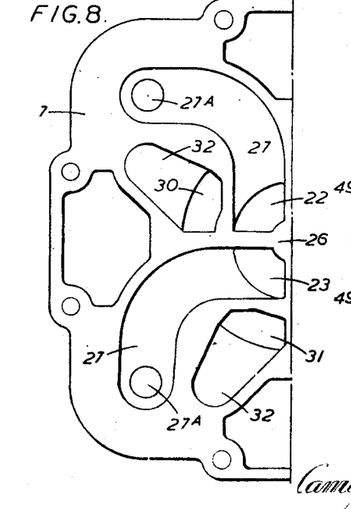
Fig. 8 is a part plan view of the underside of the valve plate.

Referring to Figs. 7 and 8, on its upper face the valve plate 7 is formed with a central circular raised port face 35 in which four segmental outlet ports 22, 23, 24 and 25 are formed, the ports being separated from each other by a central blank part 26 and four radial ribs. Each of these outlet ports is put into communication with one of the said outlet ports 13 in the carrier 5, see Figs. 2, 4 and 5 by means of a channel 27, see Figs. 2 and 7 formed in the underside of the valve plate, the end of each channel surrounding a hole 27A through which one of the locking bolts 11 passes through the plate.

Four segmental inlet ports 28, 29, 30 and 31 are also formed in the valve plate port face 35 in a zone of larger radius between the outlet ports and the edge of the port face, these inlet ports being equidistantly spaced from each other circumferentially. Channels 32 formed in the under side of the valve plate provide communication between the said inlet ports and the inlet ports 20 in the carrier 5, see Figs. 2, 7, 8 and 10.

The valve plate port face 35 is fitted within a circular recess 33 formed in the bottom of the valve cover 8, see Figs. 3 and 10.

Figure 9:
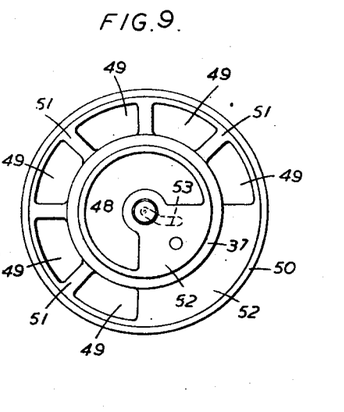
Fig. 9 is a plan view of the control valve.
Figure 11:
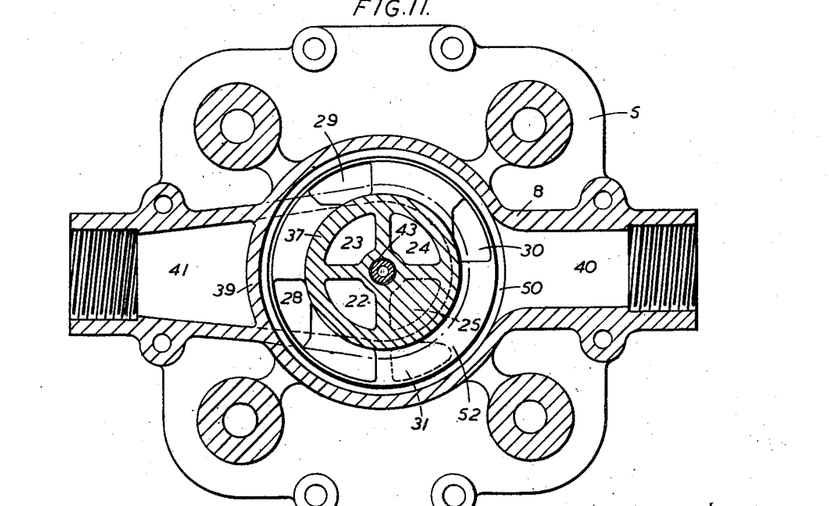
Fig. 11 is a section on the line D—D in Fig. 10.

As shown in Fig. 9, the rotary control valve 34 comprises a valve disc formed with a flat valve face 35A which is turnably mounted upon the port face 35 of the valve plate 7, see Figs. 3, 10 and 11. The valve disc is turnably guided in the said circular recess 33 formed in the bottom of the valve cover 8, and it is formed with a central, circular, upstanding boss 37 which is machined at its upper end to fit turnably in a circular hole 38 formed in the bottom face of a partition 39 provided in the valve cover between inlet and outlet chambers 40 and 41 which are formed in the valve cover as will be explained later.

A sealing ring 39A is fitted around the reduced end of the circular boss 37 and is housed in a recess 42 formed in the bottom face of the partition 39. The sealing ring acts to ensure a pressure-tight joint between the control valve 34 and the valve cover 8 and thus prevents the liquid leaking directly from the main inlet chamber 40 to the main outlet chamber 41 without passing through a filter element.

The control valve 34 is rotated upon the flat port face 35 of the valve plate by means of a spindle 43 which is coaxial with the valve and is screwed and pinned into the latter at its bottom end as shown in Fig. 10. The spindle extends upwards through a hole 44 in the top of the valve cover and through a stuffing box 45 fitted in a recess in the latter. The control valve is pressed downwards upon the port face 35 by means of a coil spring 46 which surrounds the spindle and reacts between a shoulder 47 on the spindle and the inside of the top of the valve cover below the stuffing box 45.

The valve is formed with a segmental outlet port 48, Fig. 9, which passes right through the boss 37 and extends over an angle of approximately 270°. In the valve disc itself there is a segmental inlet port 49 which is disposed between the boss 37 and the edge of the valve disc, which edge is reinforced by a small upturned edge or rib 50. As shown, actually the port 49 is divided into a number of parts by radial stiffening ribs 51, but these latter are for strengthening purposes only and the port actually functions as a single port. Like the outlet port, the inlet port also extends over an angular distance of about 270° and the ends of the inlet port are aligned with the ends of the outlet port, the extremities of the two ports being separated by a blank part 52 of the valve which covers the remaining 90° of circumferential distance. There is also cut in the face of the valve a small venting port 53 which, see Fig. 10, communicates with a duct 54 drilled axially up the valve spindle 43 to atmosphere, the use of which port will be explained hereinafter. The valve cover 8 is formed with a main outlet passage and chamber 41 the inner end of which latter surrounds the control valve spindle 43, as shown in Fig. 10, and is in constant communication with the outlet port 48 in the control valve. The valve cover is also formed with a main inlet passage and chamber 40 which latter is separated from the main outlet chamber by the said partition 39, the bottom wall of which, as previously explained, is in sealing engagement with the boss 37 of the control valve, so that the inlet port 49 in the control valve is in constant communication with the main inlet chamber 40.

Figure 1:
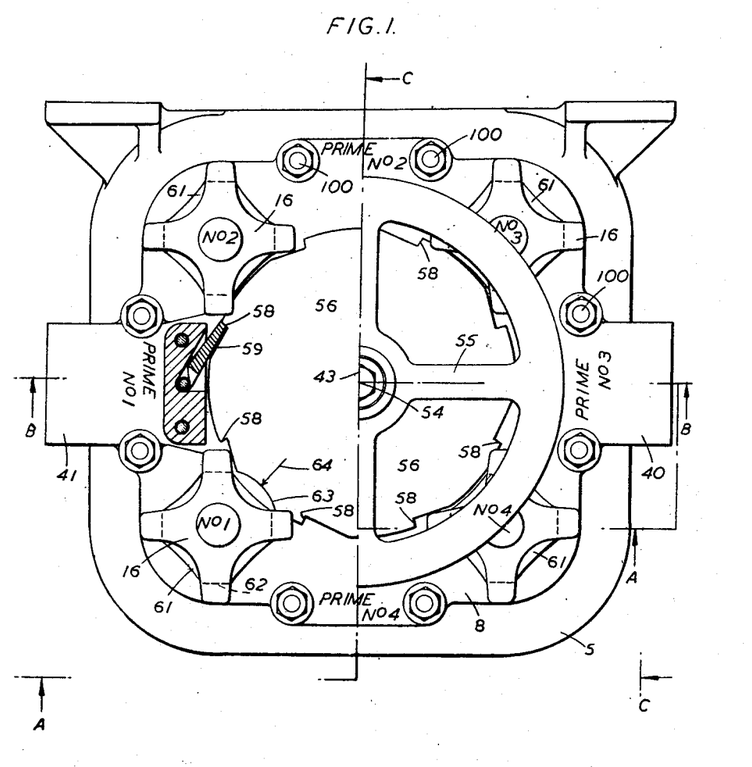
Fig. 1 is a plan view of the multiple filter assembly, part of the control valve operating hand wheel being removed to show the ratchet disc and pawl mechanism for locating the valve in its various operative and venting positions.

In order to rotate the control valve, the upper end of the valve spindle 43 is fitted with a handwheel 55, to the underside of the boss of which is fixed a ratchet disc 56 which is seated upon the flat upper surface of a boss 57 on the top of the valve cover 8. The peripheral edge of the ratchet disc is notched to provide eight teeth 58, see Fig. 1, which are equidistantly spaced circumferentially. Four of these eight teeth are positioned to correspond respectively to four "operating" positions of the control valve, and, interspersed between them are four "venting" positions, as will be explained later. Any one of the teeth 58 is adapted to be engaged by a spring-urged pawl 59 which is pivotally mounted below a cover plate 60 fixed to the top of the valve cover. The object of the pawl is to ensure that the control valve can only be turned in the clockwise direction and that the valve shall be located correctly in any of its working and venting position.

The base 61 of each of the said hand knobs 16 at the top ends of the locking boss 11 is of square formation having slightly flattened corners 62. These flattened points of the square parts are so disposed relatively to the periphery of the ratchet disc 56 that if any attempt be made to rotate the hand knobs they interfere with the edge of the ratchet disc and thus prevent rotation. A segmental recess 63 is cut in the edge of the disc, at such a position that it will be disposed opposite the base 61 on one of the four hand knobs 11 whenever the ratchet disc 56 is stopped at any one of the four operating positions, the hand knob opposite which it is located depending upon the operating position at which the ratchet disc is stopped. This segmental recess affords a clearance in which the flattened corners of this hand knob can turn. Thus, only that filter which is isolated from the liquid supply can be opened. For convenience in operation and to render it more conspicuous the recess is marked with an arrow 64 on top of the disc.

After an isolated filter has been opened, for cleaning purposes for example, and is again closed, it is necessary to evacuate the air entrapped in the filter and prime the filter. This is accomplished by turning the handwheel 55 and, therefore, the control valve 34 until the pawl 59 engages with the next tooth 58 on the ratchet disc 56, the said arrow 64 on the latter then pointing to one of four positions which are respectively indicated on the valve cover 8 by the words "Prime 1," "Prime 2," "Prime 3" and "Prime 4," these indications being arranged between the axes of the hand knobs 16 and equidistantly from each other at an angle of 90°. Owing to the spacing of the outlet ports 22 to 25 and the inlet ports 28 to 31 in the port face of the valve plate, the effect of turning the control valve through an angle of 45° corresponding to the spacing between two teeth 58 on the ratchet disc is to put the outlet port of that filter which has previously been isolated in communication with the main outlet chamber 41 in the head, and also in communication with the atmosphere via the aforesaid venting port 53 and the axial duct 54 in the spindle, the inlet port of that filter remaining closed. This will be clear from an inspection of Figs. 7 and 9, the control valve being shown in a venting position in Fig. 7 superimposed upon the valve plate in chain dotted lines.

Under these circumstances a portion of the oil from the main outlet chamber 41 in the valve cover can flow backwards through the outlet port 48 in the control valve into the said filter, the entrapped air being expelled to atmosphere through the venting port 53 and air duct 54 formed in the valve spindle 43. As soon as all the air has been vented and oil appears, the control valve can be turned through another 45°, whereupon the previously isolated filter will be included into the system again and the next filter will be isolated. The venting port 53 in the valve face now communicates with the last mentioned filter but as that is now isolated from the system no oil can be discharged through the port and the hole 54 in the valve spindle.

In operation, oil from the supply source enters the main inlet chamber 40 in the valve cover 8. Three of the inlet ports, say 28, 29 and 30 in the port face of the valve plate are open to the inlet port 49 in the control valve 34 and are thus in communication with the inlet chamber 40. Oil is thus fed via their inlet ports to three of the filters, Nos. 1, 2 and 3, but the inlet of the filter 4 is isolated as the blank part 52 of the control valve masks the inlet port 31 in the port face of the valve plate. Similarly, the outlet ports 22, 23, and 24 from the same three filters in the port face are open to the outlet port 48 in the control valve and are thus in communication with the said main outlet chamber 41. Filtered oil can thus flow from the interiors of the filter elements in the filters 1, 2 and 3, but the outlet of the filter 4 is closed, since the blank part 52 of the control valve masks the outlet port 25 in the port face of the valve plate. The filter 4 is thus completely isolated from the system and can be opened.

Assuming that the filter 4 has been opened, cleaned and closed, and that the control valve 34 has been turned through 45°, the outlet port 48 in the valve will then communicate with a small portion of the outlet port 25 in the port face of the valve plate and thus permit oil to flow back from the main outlet chamber 41 into the filter 4 at a slow rate. At the same time air entrapped in the filter can escape to atmosphere through the vent port 53, which is also in communication with the port 25. It will be noted that in this position of the valve 34 the inlet port 31 to the filter 4 is not yet opened. If the control valve is again turned through 45°, the inlet and outlet ports will be fully opened and the filter 4 will be completely included in the supply system, while the next filter 1 will be completely isolated since the blank part 52 of the valve will mask its inlet port 22 and its outlet port 28 in the port face of the valve plate, the filters 2 and 3 will remain included in the system and the vent port 53 will be in communication with the isolated filter 1.

Figure 11, which as previously mentioned is a section on the line D—D in Figure 10, shows the control valve in position. The inlet ports 28, 29 and 30 in the valve plate port face are shown in full through the inlet port 49 in the valve, the radial stiffening ribs 51 being omitted for clearness. The outlet ports 22, 23 and 24 are also shown in full through the valve outlet port 48 but the inlet port 31 and the outlet port 25 are shown in broken lines as they are hidden by the blank sector 52 of the valve.

It will be appreciated that the filter elements may be of any desired construction and shape. For example, they may be cylindrical or star-shaped and may comprise filtering fabric or other filtering media arranged upon a perforated central supporting member or core.

It will also be appreciated that although the venting positions of the control valve are described above as being situated at 45° from, i. e., equidistantly from, the operative positions, they are not of necessity so placed, they could in a modified construction be placed at some other angle, i. e., unequally spaced.

I claim:

1. A multiple filter assembly adapted to be connected into a liquid supply system comprising a multi-part head consisting of a carrier, a valve plate superimposed upon the carrier, a rotatable control valve mounted for uni-directional rotation upon the valve plate and a valve cover having a main inlet chamber and a main outlet chamber, said valve cover housing said rotatable control valve, a plurality of filter containers detachably carried by said carrier, a filter element mounted within each of said containers, said carrier having a liquid inlet and a liquid outlet for each of said containers, a plurality of liquid inlet passages formed in said valve plate, each of said inlet passages communicating with a different liquid inlet in said carrier, a plurality of liquid outlet passages formed in said valve plate, each of said liquid outlet passages communicating with a different liquid outlet in said carrier, said valve being superimposed upon said valve plate so that said valve forms a liquid-tight seal between said main inlet chamber and said main outlet chamber, said valve being provided with an inlet port which when the valve is in any of its operative positions is adapted to provide liquid communication between said main inlet chamber and all of said inlet passages except at least one of said inlet passages and to provide liquid communication between the main outlet chamber and all of the outlet passages with the exception of at least one of said outlet passages, said excepted inlet and outlet passages leading to and from the same filter container, whereby at least one filter is always isolated from the liquid supply system while all of the other filters are included in the system, means including a spindle for turning said rotary control valve from the exterior of the assembly, and a ratchet and pawl mechanism adapted to insure that the valve shall be turnable in one direction only and also that it shall be correctly located in each of its operative or venting positions.

2. An assembly as claimed in claim 1, wherein said ratchet and pawl mechanism comprises a ratchet member which is provided with a set of ratchet teeth each corresponding with an operative position of said control valve, and a spring urged pivoted pawl adapted to engage behind each of these teeth to locate the control valve in one of its operative positions.

3. A multiple filter assembly adapted to be connected into a liquid supply system comprising a multi-part head consisting of a carrier, a valve plate superimposed upon the carrier, a rotatable control valve mounted for uni-directional rotation upon the valve plate and a valve cover having a main inlet chamber and a main outlet chamber, said valve cover housing said rotatable control valve, a plurality of filter containers detachably carried by said carrier, a filter element mounted within each of said containers, said carrier having a liquid inlet and a liquid outlet for each of said containers, a plurality of liquid inlet passages formed in said valve plate, each of said inlet passages communicating with a different liquid inlet in said carrier, a plurality of liquid outlet passages formed in said valve plate, each of said liquid outlet passages communicating with a different liquid outlet in said carrier, said valve being superimposed upon said valve plate so that said valve forms a liquid-tight seal between said main inlet chamber and said main outlet chamber, said valve being provided with an inlet port which when the valve is in any of its operative positions is adapted to provide liquid communication between said main inlet chamber and all of said inlet passages except at least one of said inlet passages and to provide liquid communication between the main outlet chamber and all of the outlet passages with the exception of at least one of said outlet passages, said excepted inlet and outlet passages leading to and from the same filter container, whereby at least one filter is always isolated from the liquid supply system while all of the other filters are included in the system, means including a spindle for turning the rotary control valve from the exterior of the assembly, and a ratchet and pawl mechanism adapted to insure that the valve shall be turnable in one direction only and also that it shall be correctly located in each of its operative or venting positions, said rotatable control valve being formed with an air vent port and said spindle having an air vent duct providing communication between said port and the atmosphere, said control valve being adapted to occupy as many air venting positions intermediate its said operative position as there are operative positions, and said inlet and outlet ports in the valve plate and the inlet and outlet ports in the control valve being arranged so that when the valve is brought into each of said venting positions the outlet port of any filter which has previously been isolated from said liquid supply system is put in limited or partial communication with the main outlet chamber and also in communication with the atmosphere via said venting port and said air vent duct, the inlet port in said filter remaining closed.

4. In the combination set forth in claim 3, including means wherein the rotary valve is located in the said intermediate or venting positions by the cooperation of the said pawl with teeth formed in the ratchet plate intermediate the teeth corresponding to the said operative positions of the control valve.

5. In a multiple filtering apparatus, a header structure having inlet and outlet chambers formed therein and a generally cylindrical valve chamber between said inlet and outlet chambers, a plurality of filter units each including a housing and a filter element in said housing, said header having a plurality of passageways formed therein arranged to provide an inlet and an outlet passageway between each filter unit and said valve chamber, the ends of said inlet passageways communicating with said valve chamber terminating in uniformly spaced angularly disposed inlet ports and the corresponding ends of said outlet passageways terminating in uniformly spaced angularly disposed outlet ports in said valve chamber concentric with said inlet ports, a disc valve rotatably secured in said valve chamber and having inlet and outlet ports arranged at certain positions of the valve to establish communication for the flow of fluid from said inlet chamber through a number of said filter units less than all and to said outlet chamber and to close communication to the other of said filter units and at other positions to establish communication between the filter unit or units previously isolated and said valve chamber to provide a priming flow of fluid to the said unit or units, and mechanically operating stop and visual indicating means to constrain said valve for rotation in one direction and in stages including a plurality of stages at which communication is established between said inlet and outlet chambers through certain of said filter units and other stages or positions at which the filter unit or units isolated from communication with the inlet and outlet chambers in the previous stage may be supplied with a priming flow of fluid.

6. In a multiple filtering apparatus, a header structure having inlet and outlet chambers formed therein and a generally cylindrical valve chamber between said inlet and outlet chambers, a plurality of filter units each including a housing and a filter element in said housing, said header having a plurality of passageways formed therein arranged to provide an inlet passageway and an outlet passageway for each filter unit establishing communication between the said units and the valve chamber, a valve rotatably secured in said valve chamber and including inlet and outlet ports adapted at certain positions of the valve to establish communication for a flow of fluid from said inlet to said outlet chamber through a number of said filter units less than all and to isolate the balance of said units, and at other positions to establish communication for a priming flow of fluid to the filter unit or units previously isolated, and means including stop means occupying a fixed position relative to said valve and means rotatable with the valve into cooperative relation with the fixed stop means to define a plurality of positions at which communication is established for a flow of fluid between said inlet and outlet chambers through said filter units and said valve and positions alternating with said first mentioned position at which the filter unit or units previously isolated from communication with the valve chamber may be supplied with a priming flow of fluid through said valve chamber.

7. A multiple filtering device as defined in claim 6, wherein the said stop means includes a ratchet and pawl mechanism arranged so that the valve is moved through one stage each time the pawl engages a tooth in the ratchet.

8. In a multiple filtering apparatus, a header structure having inlet and outlet chambers formed therein and a generally cylindrical valve chamber between said inlet and outlet chambers, a plurality of filter units each including a housing and a filter element in said housing, said header having a plurality of passageways formed therein arranged to provide an inlet passageway and an outlet passageway for each filter unit establishing communication between the said units and the valve chamber, a valve rotatably secured in said valve chamber and including inlet and outlet ports adapted at certain positions of the valve to establish communication for a flow of fluid from said inlet to said outlet chamber through a number of said filter units less than all and to isolate the balance of said units, and at other positions to establish communication for a priming flow of fluid to the filter unit or units previously isolated, means including stop means occupying a fixed position relative to said valve and means rotatable with the valve into cooperative relation with the fixed stop means to define a plurality of positions at which communication is established for a flow of fluid between said inlet and outlet chambers through said filter units and said valve and positions alternating with said first mentioned position at which the filter unit or units previously isolated from communication with the valve chamber may be supplied with a priming flow of fluid through said valve chamber, and means including a port in said valve adapted to communicate with the outlet of the filter unit or units being primed for venting air from the said filter unit or units.

9. In a multiple filtering apparatus, a header structure having inlet and outlet chambers formed therein and a generally cylindrical valve chamber between said inlet and outlet chambers, a plurality of filter units each including a housing and a filter element in said housing, said header having a plurality of passageways formed therein arranged to provide an inlet passageway and an outlet passageway for each filter unit establishing communication between the said units and the valve chamber, a valve rotatably secured in said valve chamber and including inlet and outlet ports adapted at certain positions of the valve to establish communication for a flow of fluid from said inlet to said outlet chamber through a number of said filter units less than all and to isolate the balance of said units, and at other positions to establish communication for a priming flow of fluid to the filter unit or units previously isolated, means including stop means occupying a fixed position relative to said valve and means rotatable with the valve into cooperative relation with the fixed stop means to define a plurality of positions at which communication is established for a flow of fluid between said inlet and outlet chambers through said filter units and said valve and positions alternating with said first mentioned position at which the filter unit or units previously isolated from communication with the valve chamber may be supplied with a priming flow of fluid through said valve chamber, and visual indicating means to indicate the filter unit or units isolated from flow of fluid or in priming position.

10. In a multiple filtering apparatus, a header structure having inlet and outlet chambers formed therein and a generally cylindrical valve chamber between said inlet and outlet chambers, a plurality of filter units each including a housing and a filter element in said housing, said header having a plurality of passageways formed therein arranged to provide an inlet passageway and an outlet passageway for each filter unit establishing communication between the said units and the valve chamber and terminating in ports in said valve chamber, a valve rotatably secured in said valve chamber and including inlet and outlet ports adapted at certain positions of the valve to establish communication for a flow of fluid from said inlet to said outlet chamber through a number of said filter units less than all and to isolate the balance of said units, and at other positions to establish communication for a priming flow of fluid to the filter unit or units previously isolated, and means to constrain said valve for rotation in one direction including a ratchet having a plurality of teeth and a pawl to engage said teeth for constraining said valve for rotation in said one direction and indicating upon its engagement with the teeth definite stages in the movement of said valve, said teeth and the ports in said valve and valve chamber being so arranged relatively that the filter units may be isolated in consecutive order upon engagement of the pawl in alternate teeth in the ratchet and that communication for the flow of priming fluid to the previously isolated filter unit or units is established upon engagement of the pawl in the other of said ratchet teeth.

11. In a multiple filtering apparatus, header structure having inlet and outlet chambers formed therein and a valve chamber between the inlet and outlet chambers, a plurality of filter units each including a housing and a filter element in said housing, means to secure said filter units in operative relation to said header including releasable parts individual to each of said units, said header having a plurality of passageways formed therein arranged to provide an inlet and outlet passageway for each filter unit establishing communication between the said filter units and valve chamber, a valve rotatably secured in said valve chamber and operable to certain positions to establish communication between a number of said filter units less than all and said inlet and outlet chamber for establishing a flow through said filter units and isolating the balance of said units, a ratchet and pawl mechanism to constrain said valve for movement in one direction, said ratchet having a periphery cooperating with the releasable part of the securing means for the filter units to prevent release thereof including a portion brought to a position relative to said securing means to release the latter for manipulation when the valve is brought to a position for isolating the same filter unit from flow of fluid therethrough.

12. In a multiple filtering apparatus, header structure having inlet and outlet chambers formed therein and a valve chamber between the inlet and outlet chambers, a plurality of filter units each including a housing and a filter element in said housing, means to secure said filter units in operative relation to said header including releasable parts individual to each of said units, said header having a plurality of passageways formed therein arranged to provide an inlet and outlet passageway for each filter unit establishing communication between the said filter units and valve chamber, a valve rotatably secured in said valve chamber and operable to certain positions to establish communication between a number of said filter units less than all and said inlet and outlet chamber for establishing a flow through said filter units and isolating the balance of said units, a generally disc-shaped ratchet rotatable with said valve and having a periphery cooperating with said releasable securing means to prevent manipulation of the latter for the purpose of releasing the same, a plurality of teeth and a recess in said periphery, and a pawl to engage said teeth and thereby establish definite positions of said valve, said teeth and recess being so arranged relative to said valve that filter units are isolated from the flow of fluid in consecutive order and upon engagement of the pawl in alternate teeth in the ratchet and simultaneously with the isolation of a filter unit said recess is brought to a position at which the securing means for the said isolated filter unit is released for manipulation and upon the engagement of the pawl in the other of said teeth in the ratchet the valve establishes communication for the flow of priming fluid to the previously isolated filter unit or units.

13. In a multiple filtering apparatus, header structure having inlet and outlet chambers formed therein and a valve chamber between the inlet and outlet chambers, a plurality of filter units each including a housing and a filter element in said housing, means individual to said filter units to secure the same in operative relation to said header including a part threadedly secured in filter holding relation having a polygonal portion, said header having a plurality of passageways formed therein arranged to provide an inlet and outlet passageway for each filter unit establishing communication between the said units and valve chamber, a valve rotatably secured in said valve chamber and operable to certain positions to establish communication between a number of said filter units less than all and said inlet and outlet chamber for establishing a flow through said filter units and isolating the balance of said units, a generally disc-shaped ratchet rotatable with said valve and having a periphery extending into close proximity to the polygonal portion of said securing means to prevent turning thereof, a plurality of teeth and a recess in said periphery, and a pawl to engage said teeth and constrain said valve and ratchet for rotation in one direction, said teeth and recess being so arranged relative to said valve that one filter unit is isolated from the valve chamber and the other units placed in communication therewith upon engagement of the pawl in alternate teeth in the ratchet and simultaneously said recess is brought opposite the said polygonal portion of the securing means for said isolated filter unit to permit turning of the same and upon engagement of the pawl in the other of said teeth in the ratchet the valve establishes communication for the flow of priming fluid to the previously isolated filter unit.

CAMILLE CLARE SPRANKLING LE CLAIR.

REFERENCES CITED

The following references are of record in the file of this patent:

UNITED STATES PATENTS

| Number | Name | Date |
|---|---|---|
| 802,714 | Smith | Oct. 24, 1905 |
| 1,515,080 | Strachen et al. | Nov. 11, 1924 |
| 1,759,927 | Zivicky | May 27, 1930 |
| 1,774,758 | Morse et al. | Sept. 2, 1930 |
| 1,842,990 | Lentz | Jan. 26, 1932 |
| 1,861,805 | Lentz | June 7, 1932 |
| 1,961,386 | Payne | June 5, 1934 |
| 2,173,060 | Andrews | Sept. 12, 1939 |
| 2,333,609 | Widmann | Nov. 2, 1943 |
| 2,441,526 | Zollinger | May 11, 1948 |
| 2,473,032 | Le Clair | June 14, 1949 |